H. G. WOMACK.
DISAPPEARING AUTOMOBILE TOP.
APPLICATION FILED MAY 9, 1916.
1,233,946.
Patented July 17, 1917.
2 SHEETS—SHEET 1.
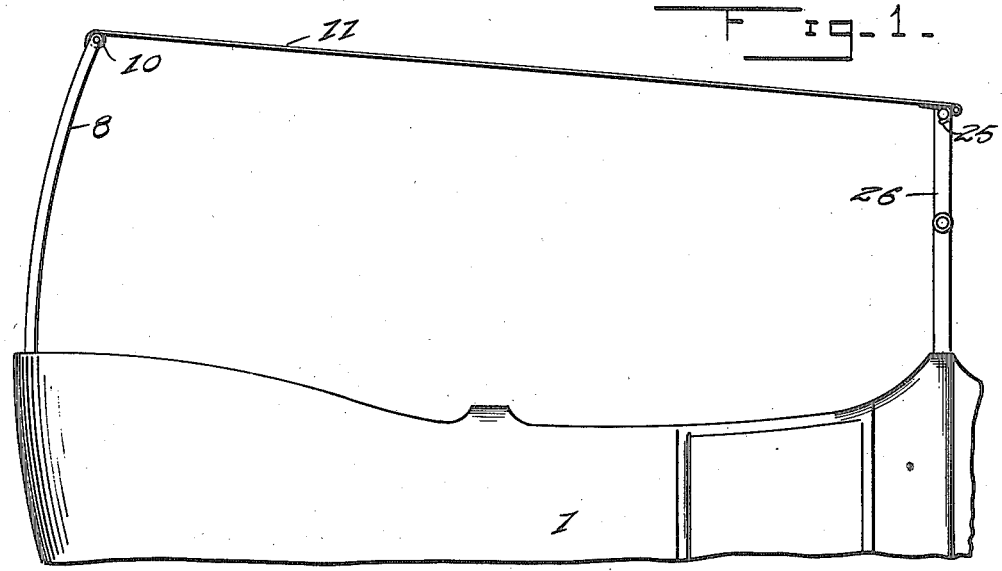
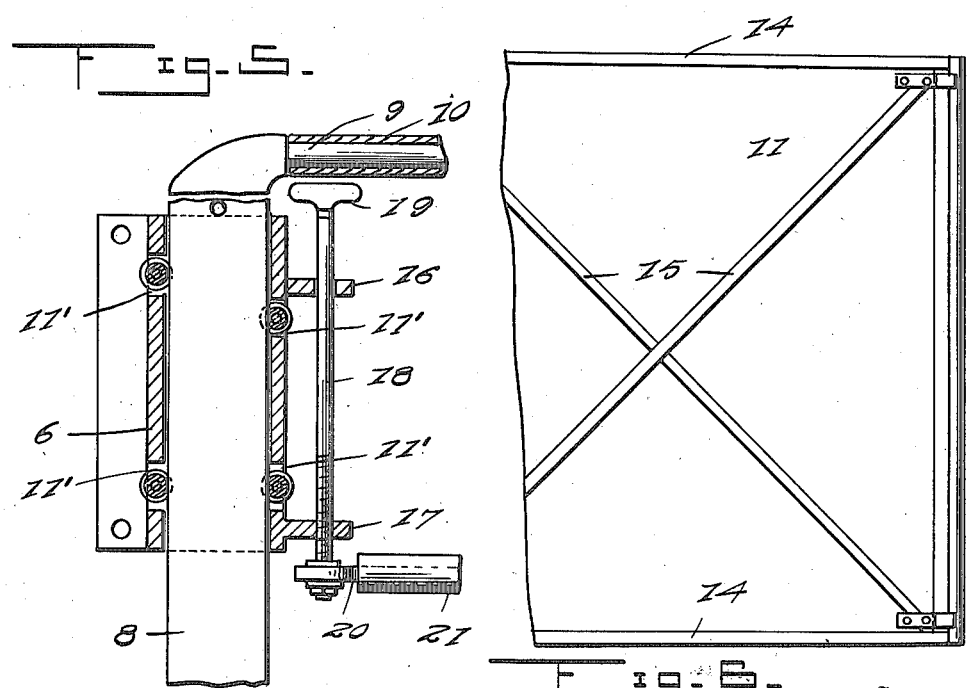
Inventor
H.G. Womack.
Witness
By
Attorney

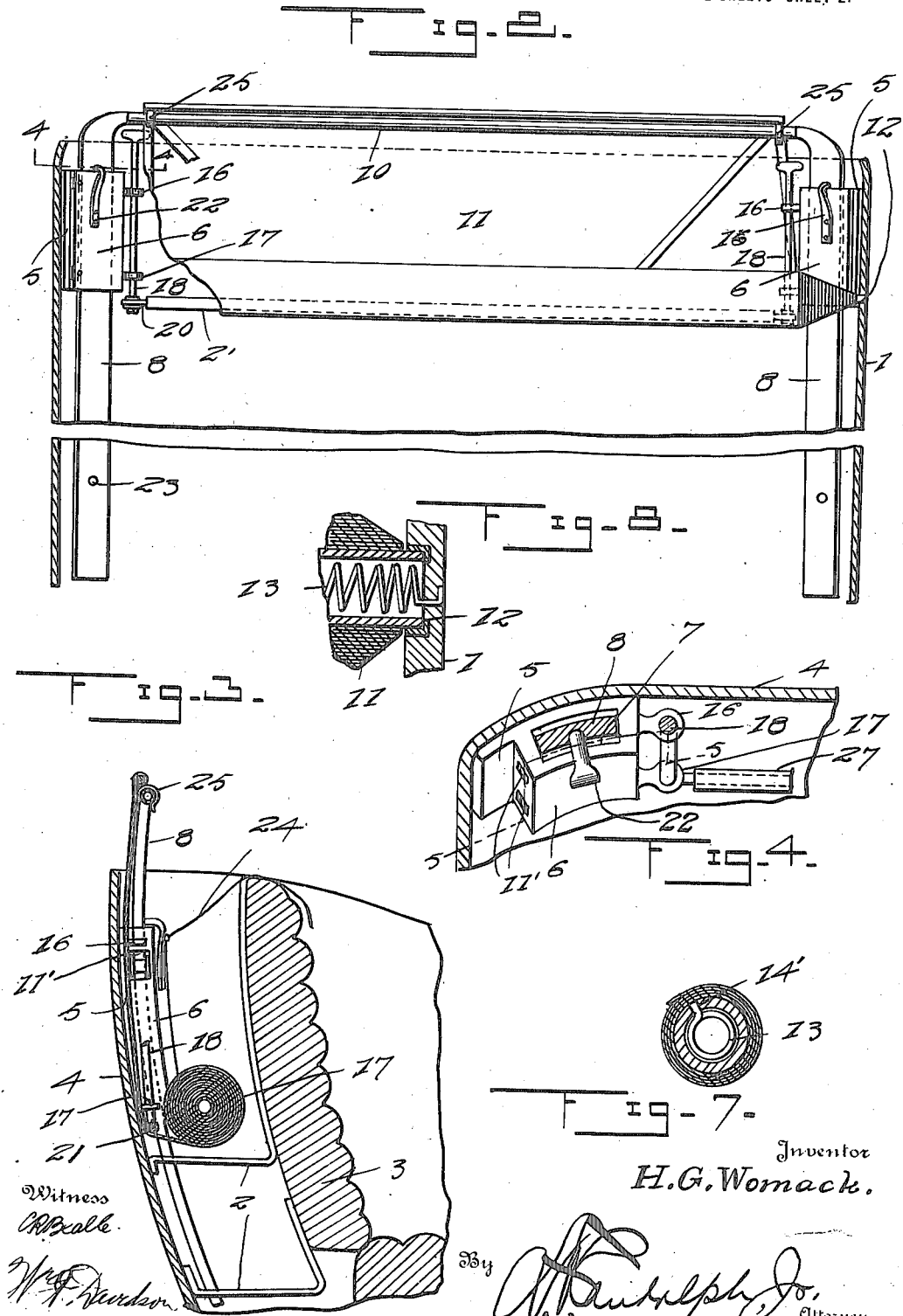

UNITED STATES PATENT OFFICE.

HARRY G. WOMACK, OF ST. LOUIS, MISSOURI.

DISAPPEARING AUTOMOBILE-TOP.

1,233,946.   Specification of Letters Patent.   Patented July 17, 1917.

Application filed May 9, 1916. Serial No. 96,367.

*To all whom it may concern:*

Be it known that I, HARRY G. WOMACK, a citizen of the United States, residing at St. Louis, in the city of St. Louis and State of Missouri, have invented certain new and useful Improvements in Disappearing Automobile-Tops; and I do hereby declare the following to be a full, clear, and exact description of the invention, such as will enable others skilled in the art to which it appertains to make and use the same.

This invention relates to an automobile top and has for its primary object to provide means whereby the top may be concealed within the automobile body to protect it from dirt and dust when not in use.

An object of this invention is to provide a spring roller, having the top secured thereto and wound thereon, whereby the top may be unwound from the roller against the tension of the spring and attached to the wind shield to completely cover the seats of the automobile body, thus protecting the occupants of the automobile from either rain or sun.

Another object of this invention is to provide supporting standards slidably mounted within the body of the automobile and connected together by a rod which is adapted to support and space the rear end of the top from the rear end of the automobile when in an operative position.

A further object of this invention is to provide brackets mounted and concealed within the rear end of the automobile body for slidably receiving the supporting standards, whereby they may be moved upwardly from the automobile body to support the top and which may be moved downwardly within the automobile body when the top is wound on the roller and which will hold the top from entirely winding upon the roller when the top is detached from the wind shield.

A further object of this invention is to provide means whereby the top may be drawn taut when attached to the wind shield or in an operative position.

A still further object of this invention is to provide a disappearing automobile top of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a fragmentary side elevation of an automobile body, illustrating my invention applied thereto and in an operative position, Fig. 2 is a front elevation of a disappearing automobile top, constructed in accordance with my invention, Fig. 3 is a vertical sectional view, illustrating the disappearing top in an inoperative position.

Fig. 4 is a detail sectional view taken on the line 4—4 of Fig. 2,

Fig. 5 is a fragmentary vertical sectional view of one of the brackets for the supporting standards, Fig. 6 is a fragmentary bottom plan view of the top, Fig. 7 is a vertical sectional view of the spring roller, illustrating the means of securing one end of the spring to the roller, and Fig. 8 is a detail sectional view illustrating the means of securing the other end of the spring to the automobile body.

Referring to the drawings in detail, the numeral 1 indicates as an entirety, an automobile body, having brackets 2 for spacing the cushion 3 of the rear automobile seat from the rear wall 4 of the body, providing a space in which my invention is applied.

A pair of curved brackets 5 are bolted or otherwise secured to the rear wall 4 within the space provided between the cushion 3 and the rear wall 4 and are provided with offset portions 6 forming guide ways 7 to slidably receive supporting standards 8 which are curved throughout their length to conform to the curvature of the brackets 5. The upper ends of the standards 8 are reduced and bent at right angles to provide connecting arms which are welded or otherwise secured to the ends of a rod 9, which has journaled thereon a suitable roller 10 for supporting a top 11, which will be hereinafter more fully described. Suitable grooved rollers 11' are journaled in the sides of the offset portions 6 of the brackets 5 for engagement with the edges of the standards 8 for reducing friction between the brackets and the standards as they move upwardly and downwardly therein.

A roller 12 is journaled to the side walls of the body 1 within the space provided between the rear wall 4 and the cushion 3 and adjacent the lower ends of the brackets 5. A suitable coil spring 13 is mounted within the roller 12 and has one of its ends secured to the roller 12 as illustrated at 14' and its opposite end attached to one of the side walls of the body 1 to provide a spring rewinding roller. The top 11 consists of a suitable piece of fabric or other suitable material, having one of its ends secured to the roller 12 by screws or other suitable fastening means and is wound thereon. The edges and ends of the top 11 are bound with flexible metallic strips 14 and also provided with diagonally arranged bracing strips 15 of flexible material to prevent the top 11 from sagging when in an operative position as illustrated in Fig. 1.

A pair of relatively spaced ears 16 and 17 are formed upon the sides of the offset portions 6 of the brackets 5 to rotatably support adjusting rods 18 which are provided with screw-threads to coöperate with the screw-threads within the ears 17. The operating rods 18 are provided with handles 19 upon their upper ends and adapted to have their lower ends extend below the ears 17 and secured to a rod 20 which has a friction roller 21 journaled thereon.

Suitable spring catches 22 are bolted or otherwise secured to the offset portions 6 of the brackets 5 adjacent their upper ends and are provided with their free ends bent at right angles to overlie the guide ways 7 for an engagement with the supporting standards 8. The supporting standards 8 are provided with openings 23 adjacent their upper and lower ends for receiving the free ends of the spring catches 22. Suitable handles or rods 24 are secured to the spring catches 22 and extend outwardly of the space occurring between the rear wall 4 and the cushion 3 for disengaging the spring catches 22 from the supporting standards 8 when desired.

The top 11 feeds from the roller 12 under the friction roller 21 and is secured to the roller 10 upon the rod 9 by means of hooks 25 carried by the free end of the top 11. When desiring to place the top 11 in an operative position or over the body 1, the spring catches 22 are disengaged from the upper openings 23 of the supporting standards 8 and by pulling upwardly upon the supporting standards 8 they will be moved out of the space occurring between the rear wall 4 and the cushion 3 and will be supported in a raised position by the spring catches 22 engaging the lower openings 23 in the standards. The free end of the top 11 is then drawn over the roller 10 and secured to the wind shield 26 of the automobile by the hooks 25 as clearly illustrated in Fig. 1. When the top 11 is in this position, the top will be entirely unwound from the roller 12 and by manipulating the rods 18, the friction roller 21 will be moved downwardly causing the top 11 to become taut to prevent same from sagging between the supporting standards 8 and the wind shield 26.

When desiring to remove the top 11, the hooks 25 are disengaged from the wind shield 26 and the top 11 will automatically wind upon the roller 12 under the influence of the tension of the spring 13 until the hooks 25 engage the roller 10. The spring catches 22 are then disengaged from the lower opening 23 of the supporting standards 8 which will allow said standards to slide downwardly within the space occurring between the rear wall 4 and the cushion 3 to conceal the top from view and which will protect it from dirt and other foreign matter.

From the foregoing description taken in connection with the accompanying drawings, it will be noted that a one man's top has been provided which may be readily placed in an operative position or an inoperative position by one person, eliminating the necessity of employing two persons to put up or put down the top as now required by automobile tops which are now upon the market.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination with an automobile body provided with a compartment at its rear end, of a front supporting element carried by the body, brackets secured within the compartment, standards slidably mounted in the brackets for withdrawal therefrom into operative position, means supporting the standards in operative position, a rod connecting the standards together, a roller journaled on the rod, a tension roller journaled in the compartment, a top secured at one end to the roller and passing therefrom over the first roller to the front element, means detachably securing the top to the front element, a friction roller adjustably secured to the brackets for an engagement with the top to draw said top taut when secured to the front element.

2. In combination with an automobile body provided with a compartment at its rear end, of a front supporting element carried by the body, brackets mounted within the compartment, standards slidably mounted in said brackets for withdrawal therefrom into operative position, means supporting the standards in operative position, a rod connecting the upper ends of the standards together, a roller journaled on said rod, a tension roller journaled in the compartment, a top secured at one end to the tension roller and passing therefrom over the first roller to the front element, ears formed on said brackets, adjusting rods threaded to said ears, a roller secured to the lower ends of the adjusting rods for an engagement with the top to draw said top taut when secured to the front element.

In testimony whereof I affix my signature in presence of two witnesses.

HARRY G. WOMACK.

Witnesses:
A. FEINBERG,
N. M. MORRISON.